United States Patent [19]
Herbert

[11] 3,966,507
[45] June 29, 1976

[54] PROCESS FOR MANUFACTURING HOLLOW-CYLINDRICAL ROTORS

[75] Inventor: Werner Herbert, Markdorf, Germany

[73] Assignee: Dornier System GmbH, Germany

[22] Filed: Jan. 24, 1975

[21] Appl. No.: 543,935

[30] Foreign Application Priority Data
Mar. 21, 1974 Germany............................ 2413519

[52] U.S. Cl............................... 148/12 R; 148/12.4
[51] Int. Cl.² ........................ C21D 9/08; C21D 9/50
[58] Field of Search .................... 148/12 R, 12.4; 228/150, 151, 158, 231; 219/121 EM

[56] References Cited
UNITED STATES PATENTS

| | | | |
|---|---|---|---|
| 3,486,219 | 12/1969 | Davies et al. | 228/151 |
| 3,533,157 | 10/1970 | Ito et al. | 228/151 |
| 3,539,760 | 11/1970 | Rudd | 219/121 EM |
| 3,729,124 | 4/1973 | Kedzior et al. | 228/151 |
| 3,751,623 | 8/1973 | Doublet | 228/150 |

Primary Examiner—W. Stallard
Attorney, Agent, or Firm—James E. Bryan

[57] ABSTRACT

This invention relates to a process for manufacturing an axially symmetrical rotor adapted to rotate about the vertical axis thereof and having a length greater than the diameter thereof which comprises rolling a thin, high-strength steel sheet to form a cylinder having a longitudinally-extending joint,
welding said joint by electron beam welding,
solution-treating the blank thus formed,
and bringing the blank to its final dimensions by means of the three-roll press rolling process wherein the blank mounted on a rotating pressure mandrel having a stop is pressed by pressure rollers moving toward the stop while the material of the blank flows counter-currently with respect thereto.

3 Claims, No Drawings

PROCESS FOR MANUFACTURING HOLLOW-CYLINDRICAL ROTORS

The present invention relates to a process for manufacturing hollow-cylindrical over-critical rotors for gas ultracentrifuges.

For the operation of gas ultracentrifuges, it is necessary to build up a gravitational field in a rotor. The separating effect of such centrifuges is greater the higher the circumferential speed, and therewith the force of gravity, and the longer the centrifugal rotors. Since the separating output performance of centrifuges increases with the fourth power of the circumferential speed, it is necessary to utilize the materials of construction to the limit of their stability. Another problem arises due to the fact that, as a result of the increase of the separating effect by reason of the length of the rotors, the gyroscopes rotate about their axis of the smallest moment of inertia, and unbalances are thus adversely introduced into the dynamic system.

It is known to manufacture rotors for gas ultracentrifuges from an extruded sleeve in the flow-pressing or squeezing process, also known from DIN 8580 as press rolling.

Three-roll flow-pressing (designated according to DIN 8580 as press rolling) is a further development of the manually executed pressing operation that has been known for centuries for the manufacture of pots and bowls. At present this process is being employed increasingly and with a high degree of precision in the fields of aeronautics and space flight, as well as in nuclear engineering techniques for manufacturing thin-walled high-strength structural parts which are complicated in their wall thickness path.

Pressing or squeezing is one of the oldest deforming processes. In this case, a sheet ronde is pressed with a pressing spindle sleeve onto the pressing or squeezing mandrel. The pressing rollers are placed or set radially according to the sheet thickness. Depending upon the respective machine type, either the pressing mandrel or the pressure rollers are axially displaced. The pressure rollers are controlled via a copying device. According to the shape-changing capacity, several passes are required. If the pressing ratio D/d permits, the sheet ronde may be thrown over in one working step.

The advantage of this process as compared to deep-drawing is the simple form of the tools.

The limit of the pressing process lies, similarly to the deep-drawing operation, in premature fold formation in the flange and/or in so-called "bottom breakers".

For this pressing operation, a sleeve is cut off, and a flow-pressed blank is made by turning, grinding, and honing. In order to obtain wall thicknesses of less than 1 mm, this blank is then brought to its final dimensions in four or more flow-pressing operations. The hollow-cylindrical body is trimmed after each flow-pressing or squeezing operation. This expensive manufacturing process assures that the small wall thickness tolerances of less than 10 $\mu$m required are maintained. Because of the numerous flow-pressing and trimming operations, additional cleaning steps are necessary. At the same time, the tolerances and surface errors will increase the more flow-pressing operations that have to be performed.

Hollow-cylindrical bodies (for example tubes having a large diameter) also may be made from rolled sheets which are welded at the longitudinal seam. The welding seam is then re-worked so that it will not be visible to the naked eye and examined, for instance by means of ultrasonics or X-rays, in order to assure the required welded seam quality and stability. However, the irregularities which remain in the material make such hollow-cylindrical bodies unsuitable as over-critical rotors. In addition, rolled sheets have wall thickness tolerances of about 0.1 mm, and the introduction of annular sheet grooves required particularly in the case of over-critical rotors cannot be carried out without flaws in the area of the welded seam. At that point the material breaks or else unevennesses are produced which cannot be removed.

It is also known to subject a blank welded at the longitudinal seam and consisting of soft Hastelloy Alloy C to a flow-pressing or squeezing process. However, this serves merely for the purpose of making the welding seam invisible, and for manufacturing a tube that is equal in appearance to a drawn tube.

It is an object of the present invention to manufacture a high-speed rotor.

It is another object of the invention to provide a rotor whose length is a multiple of its diameter.

It is a further object of the invention to provide a process for manufacturing rotors in which the rotor wall is homogeneous and in which only small imbalances can occur.

It is equally an object of the invention to provide a rotor which can be made with a saving in costs and working steps.

It is yet another object of the invention to provide a rotor which has a small wall thickness with small wall thickness tolerances, and an extremely high stability.

These objects are obtained, in accordance with the present invention, in a process in which a planar high-strength sheet of steel is rolled and welded at the longitudinal seam by an electron beam, and the blank thus produced is solution-treated and brought to its final dimensions in a press rolling or squeezing operation.

Longitudinal seam welded tubes from high-strength sheet steel have not been made heretofore since only an expensive dressing would have assured the required roundness thereof, and the stability thereof was small because of the lack of cold work-hardening. Whenever a homogeneous tube having good stability properties was called for, drawn tubes were previously used without exception. Thin wall thicknesses were obtained by repeatedly removing material.

In contrast thereto, the afore-described novel manufacturing process affords surprising advantages. While numerous press rolling or squeezing operations or steps were necessary heretofore, a single press rolling or squeezing step now suffices to obtain the desired dimensions of the rotor. At the same time, the required wall thickness tolerances are adhered to or maintained, and any irregularities of the welded seam are completely eliminated. The stability values of the rotor are considerably improved due to the cold work-hardening occurring during the squeezing or press rolling operation. It is advantageous, moreover, that areas arranged so as to be distributed over the longitudinal direction of the rotor are ground at the circumference in known manner and are provided with annular sheet notches. The notches also may be made without flaws in the area of the welding seam.

Further features, advantages, and possibilities of application of the inventive manufacturing process will become more apparent from the following example as described below.

EXAMPLE

The starting material is a planar rolled sheet from the material known as RHF 33 (a martensitic hardenable steel) having an inside diameter of 145.5 mm, a length of about 1000 mm, and a wall thickness of 1 – 1.5 mm. The sheet is rolled and welded along its longitudinal seam according to the WIG process (Wolfram-Inert-Gas), or by means of electron beam welding. The welding factor is 1. Thereafter, it is solution-treated for about 1 hour in vacuo at 820°C. By solution treatment in a salt bath or in a recirculating air furnace in the homogeneous mixed crystal range of the alloys, all alloy metal is initially brought in solution. Thereafter the alloy is chilled with water, whereby the separation of the second phase is suppressed. After a short incubation period, there begins at room temperature an increase of the hardness, tensile strength, and yield point, as well as a change of the physical properties.

The blank having an inside diameter of 145.5 mm is mounted on a mandrel and brought to its final dimensions in a single working step in the threeroll press rolling process. The blank is mounted on a rotating pressing or squeezing mandrel having a stop, and the pressing rolls move toward the stop. The material flows counter-currently with respect thereto.

After completion of the press rolling or squeezing operation, the inside diameter is 145.5 mm; the outside diameter is 146.2 mm and the length of the hollow-cylindrical body has now increased to the factor of the reduction. The hollow-cylindrical body is now trimmed to a length of about 1000 mm. After the press rolling or squeezing, the tensile strength is about 240 – 270 kp/mm² and the wall thickness deviation on the surface lines is smaller than 10 $\mu$m.

In the areas in which grooves are to be provided, about 25 $\mu$m is removed from the circumference of the material by grinding. Thereafter, the annular sheet grooves are formed.

As compared to conventional manufacturing methods or processes for over-critical rotors, the saving in material is about 75%, the number of working steps is reduced by half, and the total working time is reduced approximately 50%.

It will be obvious to those skilled in the art that many modifications may be made within the scope of the present invention without departing from the spirit thereof, and the invention includes all such modifications.

What is claimed is:

1. A process for manufacturing an axially symmetrical rotor adapted to rotate about the vertical axis thereof and having a length greater than the diameter thereof which comprises rolling a thin, high-strength steel sheet to form a cylinder having a longitudinally-extending joint, welding said joint by electron beam welding,
solution-treating the blank thus formed,
and bringing the blank to its final dimensions by means of the three-roll press rolling process wherein the blank mounted on a rotating pressure mandrel having a stop is pressed by pressure rollers moving toward the stop while the material of the blank flows counter-currently with respect thereto.

2. A process according to claim 1 in which the blank is solution-treated at a temperature of about 820°C.

3. A process according to claim 1 including grinding the rotor in circumferential areas distributed over the length thereof, and forming circumferential grooves in the ground areas.

* * * * *